United States Patent
Lee et al.

(10) Patent No.: US 6,239,838 B1
(45) Date of Patent: May 29, 2001

(54) CAMERA APPARATUS FOR DETECTING FOCUS VALUE ENGAGED TO OUTPUT PICTURE

(75) Inventors: Seoung Eog Lee; Jin-Soo Park; Myung Keun Yeo, all of Seoul (KR)

(73) Assignee: LG Electronics, Inc., Seoul (KR)

(*) Notice: Subject to any disclaimer, the term of this patent is extended or adjusted under 35 U.S.C. 154(b) by 0 days.

(21) Appl. No.: 08/997,849

(22) Filed: Dec. 24, 1997

(30) Foreign Application Priority Data

Dec. 27, 1996 (KR) .................................................. 96-73870

(51) Int. Cl.[7] ............................. H04N 5/262; H04N 5/232
(52) U.S. Cl. ........................................... 348/240; 348/345
(58) Field of Search .................................. 348/240, 349, 348/354, 358

(56) References Cited

U.S. PATENT DOCUMENTS 5,428,391 * 6/1995 Murata et al. ...................... 348/240
5,867,217 * 2/1999 Okino et al. ......................... 348/240
5,933,187 * 8/1999 Hirasawa et al. .................... 348/240

FOREIGN PATENT DOCUMENTS

406133206A * 5/1994 (JP) .

* cited by examiner

*Primary Examiner*—Wendy R. Garber
*Assistant Examiner*—Rashawn N. Tillery

(57) ABSTRACT

An automatically focusing camera apparatus includes an image device for photo-shooting an object and converting the resultant value to an electric signal, a signal processor for applying a digital signal process and a digital zoom process to the converted picture signal to provide a basic luminance signal and a basic color signal, a focus value detector for receiving at least one of the zoom-processed signals and detecting its focus value, and a controller for carrying out an AF (automatic focusing) control using the focus value detected by the focus value detector member. The apparatus precisely performs the processing of an object-shooting signal and the AF operation and prevents the AF operation from being distorted during a digital zoom operation.

13 Claims, 4 Drawing Sheets

CAMERA APPARATUS FOR DETECTING FOCUS VALUE ENGAGED TO OUTPUT PICTURE

BACKGROUND OF THE INVENTION

1. Field of the Invention

The present invention relates to a video camera, and more particularly to an improved video camera for detecting a focus value engaged to an output picture which makes it possible to detect a focus value from a picture signal by being engaged to a final output picture, for thereby enabling a signal process and a automatic focus control to be carried out in greater precision.

2. Description of the Prior Art

As shown in FIG. 1, a conventional camera apparatus includes: an optical system 1 having an object lens, a zoom lens and an iris, and carrying out a photo-electric conversion in order for an object picture signal to be converted to an electric signal; an AGC (automatic gain control) circuit 2 for automatically controlling the picture signal outputted from the optical system 1; a signal process unit 3 for processing and outputting a picture signal outputted from the AGC circuit 2; an A/D (analog/digital) converter 4 for converting the gain-controlled picture signal from AGC 2 to a digital signal; a Y/C separation circuit 5 for separating the converted signal into a luminance signal and a color signal; an area varying unit 6 for receiving the digital luminance signal converted in the A/D converter 4 and carrying out a zoom area varying function; a focus value detector 7 for receiving an output signal of the area varying unit 6 and detecting a focus value Fv so as to carry out an automatic focus; a controller 8 for receiving a telephoto signal and a widephoto signal, and outputting a control signal so as to drive the optical system 1 in response to the focus value outputted from the focus value detector 7; and a driving unit 9 for driving the optical system 1 under the control of the controller 8.

The operation of the thusly constituted conventional camera apparatus will now be described.

An optical signal representing an object from the optical system 1 is converted through a CCD (charge-coupled device) to an electric picture signal, which is then gain-controlled in the AGC circuit 2 and outputted via the signal process unit 3. The gain-controlled picture signal is converted to a digital signal in the A/D converter 4 so that an area varying function is carried out through the area-varying unit 6, and together therewith a focus value Fv for the luminance signal is detected in the focus value detector 7.

The focus value Fv is applied to the controller 8 which in turn receives an externally applied telephoto/widephoto signal T/W so as to drive the optical system 1 via the driving unit 9, for thereby carrying out a zoom-in/zoom-out function and an AF (automatic focusing) operation in accordance with the focus value Fv.

In more detail, the optical system 1, the AGC circuit 2, the A/D converter 4 and the Y/C separation circuit 5 process an image signal to derive a luminance signal which is provided to the area varying unit 6. The controller 8 outputs a control signal to the area varying unit 6, but the controller 8 does not output a signal directly to the Y/C separation circuit 5.

However, the signal for carrying out the AF function in the conventional camera system is employed so as to directly apply the CCD output signal to a focus value detecting signal, so that when a zoom-in/zoom-out function is carried out against an object beyond a focus range, an accurate focusing becomes difficult.

That is, because an input data signal for generating an AF estimate value is based upon the output of the AGC circuit, when digital zooming is carried out, a focusing of the accordingly appearing picture becomes performed against an object other than the finally outputted actual picture, thereby resulting in an optical parallax against the actual object.

SUMMARY OF THE INVENTION

It is another object of the present invention to provide a camera apparatus for performing an automatic focusing by using a luminance signal outputted from a digital zoom process unit as a focus value detecting signal, thereby eliminating an optical parallax and realizing an accurate automatic focusing.

It is an object of the invention to provide an apparatus (and the method inherent thereto) that avoids an optical parallax error in a situation where the optical focal point does not correspond to the center of a digitally zoomed image area. Such an apparatus according to the invention can accurately focus when more than one object is within the zoomed image area.

To achieve the above-described objects, there is provided a camera apparatus and method inherent therein for detecting a focus value based upon an output picture, the apparatus comprising: an object-shooting means for photo-shooting an object and converting an associated optical image electric signals; signal process means for applying a digital signal process and a digital zoom process to the converted picture signal to produce a digital luminance signal, a digital color signal, a digital zoom luminance signal and a digital zoom color signal, respectively; focus value detecting means for receiving at least one of the digital zoom luminance and digital zoom color signals and detecting a focus value therein; and a controller for carrying out AF (automatic focusing) control using the focus value detected by the focus value detecting means.

Further, to achieve the above-described objects, there is provided a camera apparatus and method inherent therein for detecting a focus value based upon an output picture, the apparatus comprising: object-shooting means for photo-shooting an object and converting an associated optical image into electric signals; signal process means for applying a digital signal process to the converted picture signal to produce a digital luminance signal and a digital color signal; zoom process means for receiving the digital luminance and color signals and applying a digital zoom process function to produce a digital zoom luminance signal and a digital zoom color signal; switching means for selecting one of the digital luminance signal and the digital zoom luminance signal; focus value detecting means for receiving the signal selected by the switching means and detecting the focus value therein; and a controller for controlling the switching means depending upon a quality level of a digital zooming state, and carrying out an AF control in accordance with the focus value detected by the focus value detecting means.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more clearly understood with reference to the accompanying drawings given only by way of illustrations and thus not limited to the present invention, wherein.

DETAILED DESCRIPTION OF THE INVENTION

With reference to the accompanying drawings, the camera apparatus for detecting a focus value engaged to an output picture according to the present invention will now be described.

Figure 1:
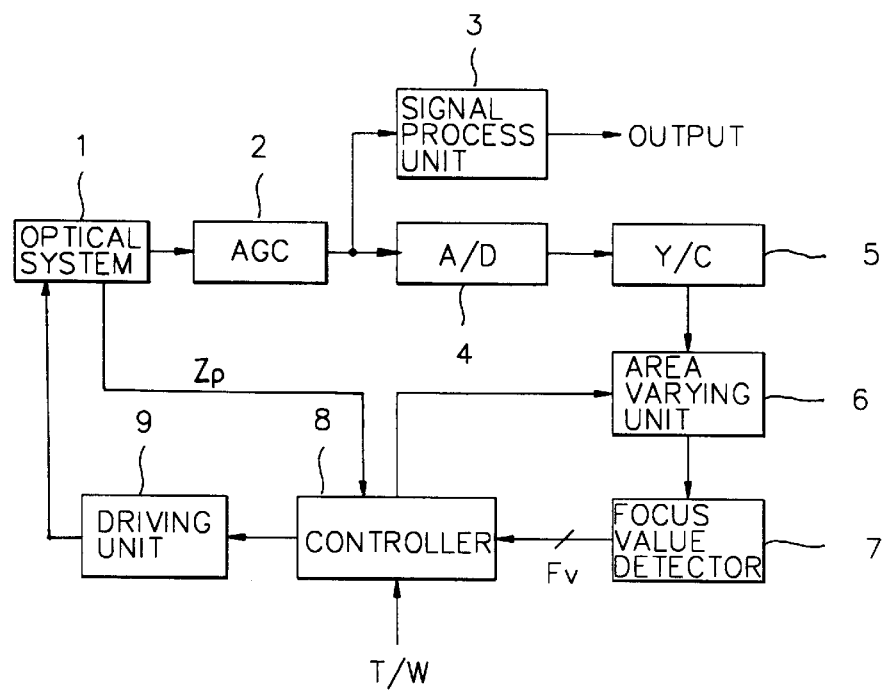
FIG. 1 is a block diagram of a conventional camera apparatus.
Figure 2:
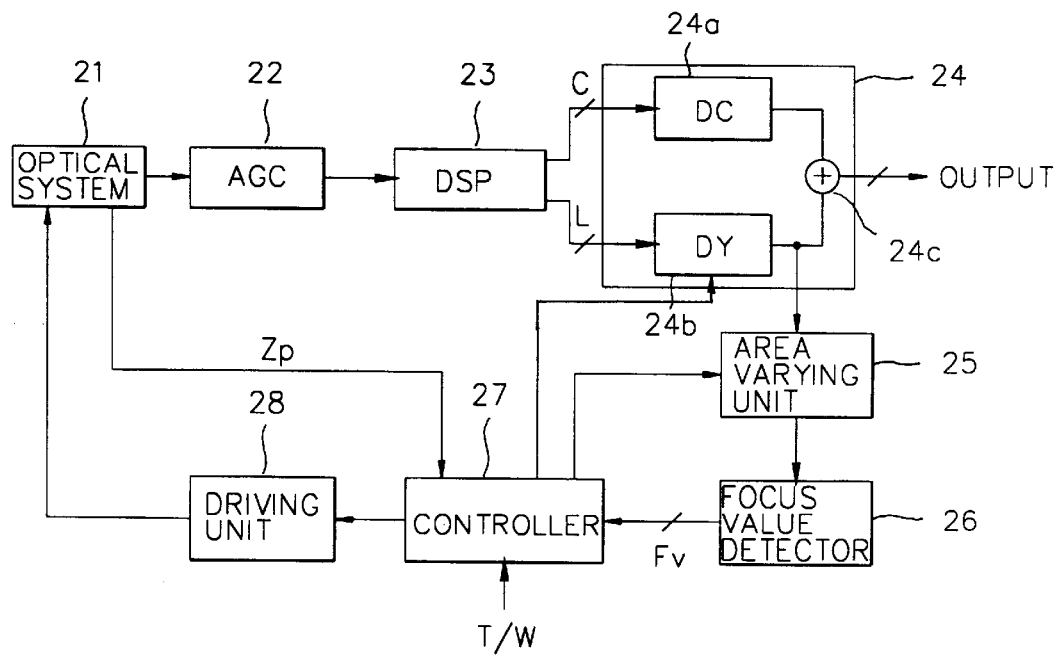
FIG. 2 is a block diagram of a camera apparatus according to a first embodiment of the present invention.

As shown in FIG. 2 (illustrating a block diagram of the camera apparatus according to the first embodiment of the present invention), the apparatus includes: an optical system 21 for photo-shooting an object and outputting an electric analog thereof and a signal Zp; an AGC (automatic gain control) circuit 22 for automatically controlling the gain of the picture signal outputted from the optical system 21; a digital signal process (DSP) unit 23 for separating luminance and color from the picture signal outputted from the AGC circuit 22; a digital zoom process unit 24 for receiving digital picture signals outputted from the digital signal process unit 23 and carrying out a digital zoom processing function based up a control signal (from a controller 27) that is a function of the signal Zp; an area varying unit 25 for receiving the digital luminance signal processed in the digital zoom process unit 24 and carrying out an area varying function; a focus value detector 26 for detecting a focus value Fv outputted from the area varying unit 25; a controller 27 for controlling an AF operation using a focus value detected by the focus value detector 26, for and carrying out zoom-in/zoom-out control in response to a telephoto/widephoto signal T/W applied thereto from an external terminal so as to control the digital zoom process unit 24, and for controlling the zoom process unit 24 based upon the signal Zp; and a driving unit 28 for driving the optical system 21 under the control of the controller 27.

The digital signal process unit 23 converts the applied picture signal to a digital signal and separates it into a digital luminance signal L and a digital color signal C. The unit 23 provides these separate signals to the digital zoom process unit 24.

The digital zoom process unit 24 parallel processes the respectively applied signals in the color zoom signal process unit 24a and the luminance zoom signal process unit 24b. The outputs of the units 24b are combined by the adder 24c and the zoom-processed digital picture signal Y/C is outputted.

Here, the luminance zoom signal from the unit 24b has its zoom area varied by the area varying unit 25. The focus value Fv of the zoomed area is detected by the focus value detector 26.

The focus value Fv denotes a value with regard to the zoom-processed digital signal. The controller 27 receives the focus value Fv and drives the optical system 21 via the driving unit 28, and further receives a zoom position detecting signal Zp so as to appropriately carry out a zoom-in/zoom-out function, whereby the picture signal and the luminance zoom signal respectively outputted from the digital zoom process unit 24 does not have an optical parallax, for thereby enabling an accurate AF to be applied to the shooting-object.

The camera apparatus of FIG. 2 operates as follows. The optical system 21, the AGC circuit 22 and the digital signal processor (DSP) 23 process an image signal to derive a digital luminance signal and a digital color signal which are provided to the digital zoom process unit 24. The digital zoom process unit 24 provides a digitally zoomed luminance signal to the area varying unit 25. The optical system 21 provides a zoom position indication signal Zp to the controller 27.

Based upon the signal Zp, the controller 27 outputs a control signal to the digital zoom unit 24. In addition, the controller 27 also controls the area varying unit 25. The varied focus area is provided to the focus value detector 26. The focus value detector 26 provides a focus value Fv to the controller 27. Based upon the focus value Fv, the controller 27 also drives the optical system 21, via the driving unit 28, to achieve accurate focusing and zooming.

Figure 3:
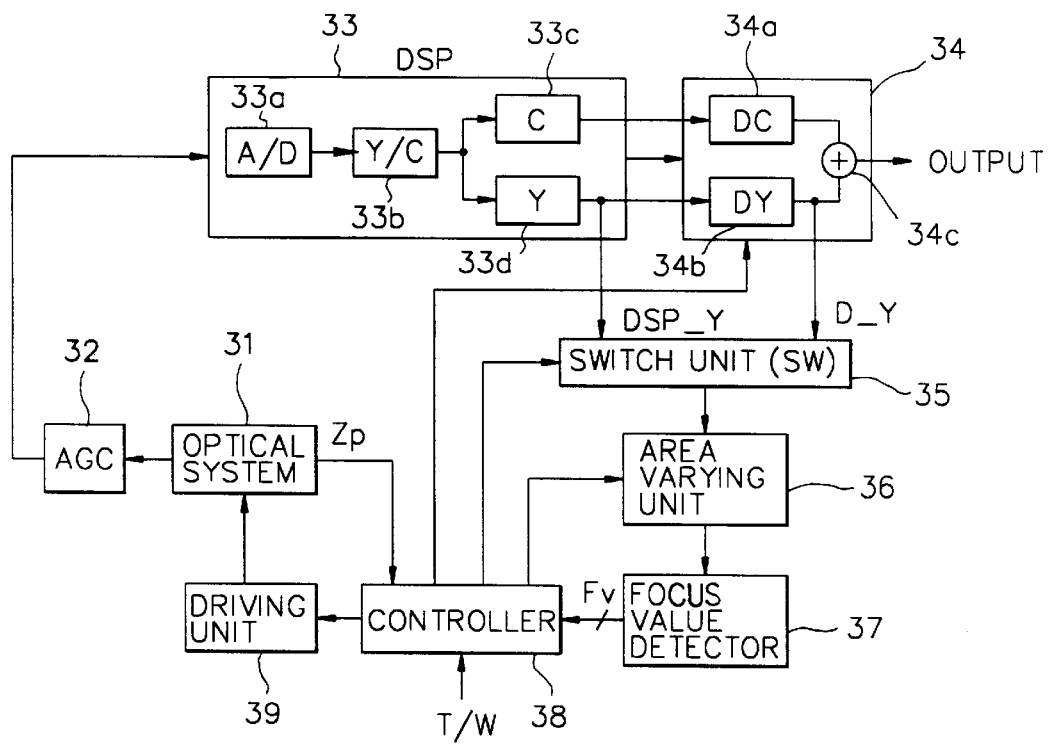
FIG. 3 is a block diagram of a camera apparatus according to a second embodiment of the present invention.

Referring to FIG. 3 illustrating a block diagram of a camera apparatus according to the second embodiment of the present invention, the apparatus includes: an optical system 31 for photo-shooting an object and outputting an electric signal; an AGC circuit 32 for automatically gain-controlling the picture signal outputted from the optical system 31; a digital signal process (DSP) unit 33 for separating luminance and color from the picture signal outputted from the AGC circuit 32; a digital zoom process unit 34 for receiving digital luminance and color signals from the digital signal process unit 33 and carrying out a digital zoom processing function; a switching unit 35 for selecting one of a luminance signal processed in the digital signal process unit 33 and the zoomed luminance signal processed in the digital zoom process unit 34; an area varying unit 36 for receiving the signal selected from the switching unit 35 and carrying out a band varying function; a focus value detector 37 for outputting a control signal to the area varying unit 36 and for detecting a focus value Fv outputted from the area varying unit 36; a controller 38 for controlling an AF operation using a focus value detected in the focus value detector 37, and carrying out a zoom-in/zoom-out control in response to a telephoto/widephoto signal T/W applied thereto from an external terminal, for thereby controlling the switching unit 35 depending upon the quality of zooming by the digital zoom process unit 34; and a driving unit 39 for driving the optical system 31 under the control of the controller 38.

The optical system 31 serves to apply a photo-electric conversion to an object-shooting picture signal which is in turn inputted to the AGC circuit 32. The picture signal which is automatically gain-controlled in the AGC circuit 32 is inputted to the digital signal process unit 33.

The digital signal process unit 33 converts the applied picture signal to a digital signal in an A/D converter 33a, and the converted digital signal is separated into a luminance signal and a color signal in a Y/C separation circuit 33b, and signal-processed in a color process unit 33c and a luminance process unit 33d. The thusly processed digital picture signals are applied to the digital zoom process unit 34.

The digital luminance signal DSP_Y processed in the luminance process unit 33d is applied to an input terminal of the switching unit 35.

The digital zoom process unit 34 signal-processes the applied signal in the zoom color signal process unit 34a and the zoom luminance signal process unit 34b, for and combines these signals in the divider circuit 34c to provide a zoom-processed digital picture signal.

The zoom luminance signal D_Y outputted therefrom is applied to another input terminal of the switching unit 35.

The switching unit 35 is controlled and switchconverted by the controller 38, and selects one from the luminance signal DSP_Y outputted from the digital signal process unit 33 and the luminance signal D_Y outputted from the digital zoom process unit 34. The selected signal is inputted to the area varying unit 36.

The camera apparatus of FIG. 3 operates as follows. The optical system 31, the AGC circuit 32 and the digital signal processor (DSP) 33 process an image signal to derive a digital luminance signal DSP_Y and a digital color signal which are provided to the digital zoom process unit 34. The digital luminance signal DSP_Y is also provided to the switch unit 35. The digital zoom unit 24 provides a digitally zoomed luminance signal D_Y to the switch unit 35, which is controlled by the controller 38.

The optical system 31 provides a zoom position indication signal Zp to the controller 38. Based upon the signal Zp, the controller 38 outputs a control signal to the digital zoom unit 34. In addition, the controller 38 controls the area varying unit 36. The varied focus area is provided to the focus value detector 37. The focus value detector 26 provides a focus value Fv to the controller 27. Based upon the focus value Fv, the controller 27 also drives the optical system 21, via the driving unit 28, to achieve accurate focusing and zooming.

If in the digital zoom mode, the controller 38 causes the switch unit 35 to select the digitally zoomed luminance signal D_Y. Else, if not in the digital zoom mode, the controller 38 causes the switch unit 35 to select the unzoomed luminance signal DSP_Y. Also, if the controller determines that the focus value Fv is not greater than a certain level, then it controls the switch unit 35 to select the unzoomed signal DSP_Y. Initially, the focus value Fv is based upon a predetermined area and, if possible, automatic focusing (AF) is carried out. If not possible, a new focus value Fv is determined and then the AF is carried out.

Figure 5:
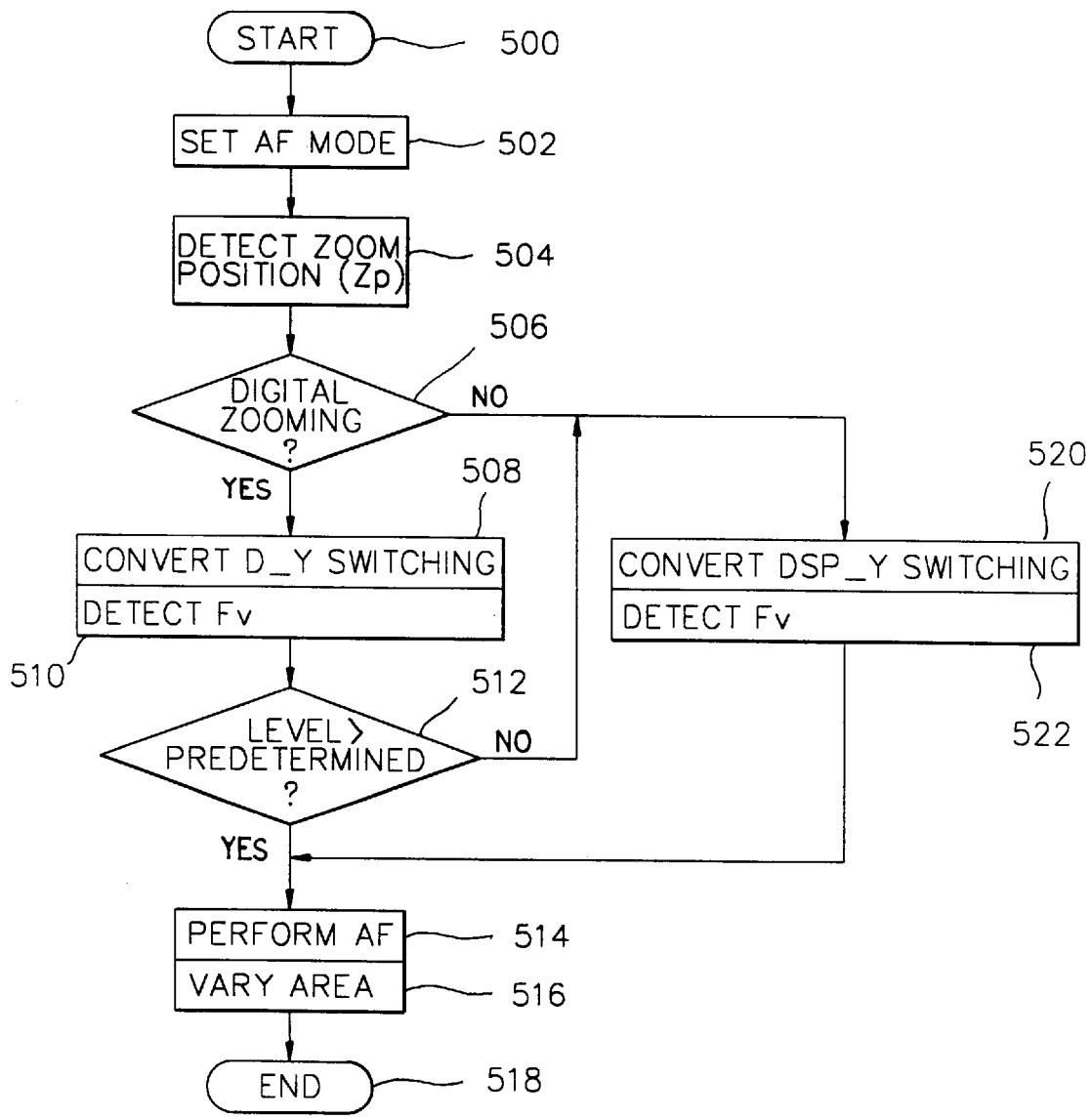
FIG. 5 is a flow chart illustrating operational steps according to the second embodiment of the present invention.

FIG. 5 is a flowchart depicting in more detail the operation of the embodiment of FIG. 3. In FIG. 5, after an AF mode is set at step 502, the controller 35 receives a zoom position signal Zp at step 504 detected from the optical system 31, and determines at step 506 whether the digital zoom mode is currently set.

When a digital zoom mode is set, the controller 38 controls the switching unit 35 at step 508 to connect the luminance signal D_Y, of the digital zoom process unit 34, to the area varying unit 36.

At step 510, the focus value detector 37 detects a focus value of the luminance signal D_Y which has been digitally zoom-processed. The controller 38 at step 512 determines whether the focus value is above a predetermined or reference level.

The level comparing judgement at box 512 denotes a step for determining whether focusing is possible. Here, if the focus value Fv as greater than a predetermined level, the controller 38 executes steps 514 and 516 and then controls the optical system 31 using the driving unit 39, for thereby carrying out an AF function.

Also, the controller 38 controls (at step 514) the digital zoom process unit 34 and (at step 516) the area varying unit 36 in response to the telephoto/widephoto signal T/W so as to make the digital zoom band variable, so that the focus value detector 37 serves to detect a focus value Fv with regard to a picture signal zoom-processed likewise, whereby the signal process and the AF operation may be precisely controlled during the AF operation.

Also, in case of non-digital zooming, the controller 38 controls (at step 520) the switching unit 35 and inputs to the focus value detector 37 the luminance signal DSP_Y outputted from the digital signal process unit 33 through the band varying unit 36.

When the digital zoom-processed luminance signal D_Y remains below a predetermined level, that is, when a picture focusing based upon the digital zoom becomes difficult, i.e., the magnitude of a given high frequency component is too low to reliably recognize an edge, the switching unit 35 selects the luminance signal DSP_Y. In this circumstance, flow proceeds from step 512 to step 520.

In this case, a focus value Fv of the digital processed luminance signal DSP_Y is detected at step 522, and the controller 38 receives the focus value Fv, for thereby carrying out an AF function (at step 514) and an area varying function (at step 516).

Figure 4:
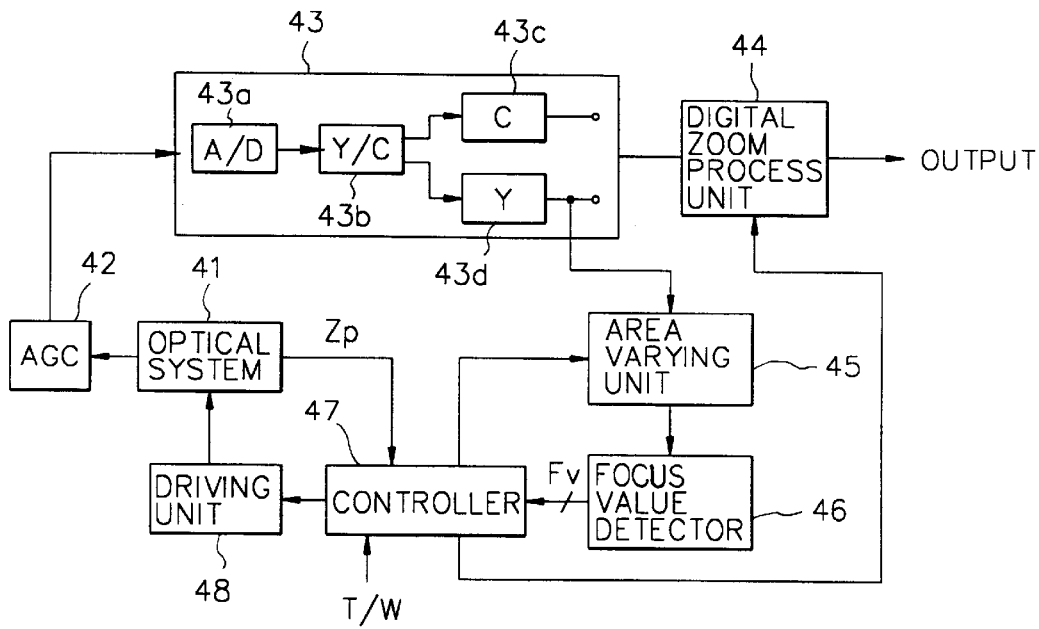
FIG. 4 is a block diagram of a camera apparatus according to a third embodiment of the present invention.

In FIG. 4 (which depicts the camera apparatus according to the third embodiment of the present invention), the apparatus includes: an optical system 41 for photo-shooting an object and outputting an electric signal; an AGC (automatic gain control) circuit 42 for automatically gain-controlling the picture signal outputted from the optical system 41; a digital signal process (DSP) unit 43 for separating luminance and color from the picture signal outputted from the AGC circuit 42; a digital zoom process unit 44 for receiving a digital picture signal outputted from the digital signal process unit 43 and carrying out a digital zoom processing function; an area varying unit 45 for receiving the digital luminance signal processed in the digital zoom process unit 44 and carrying out an area varying function; a focus value detector 46 for detecting a focus value Fv outputted from the area varying unit 45; a controller 47 for controlling an AF operation using a focus value detected in the focus value detector 46 and carrying out a zoom-in/zoom-out control in response to a telephoto/widephoto signal T/W applied thereto from an external terminal so as to control the digital zoom process unit 44; and a driving unit 48 for driving the optical system 41 under the control of the controller 47.

The optical system 41 serves to apply a photo-electric conversion to an object-shooting picture signal which is in turn inputted to the AGC circuit 42. The picture signal which is automatically gain-controlled in the AGC circuit 42 is inputted to the digital signal process unit 43.

The digital signal process unit 43 converts the applied picture signal to a digital signal in an A/D converter 43a, and the converted digital signal is separated into a luminance signal and a color signal in a Y/C separation circuit 43b, and signal-processed in a color process unit 43c and a luminance process unit 43d. These signals are combined (e.g., by a divider (not shown)). The thusly summed or combined digital picture signal is applied to the digital zoom process unit 44.

The digital zoom process unit 44 signal-processes the applied signal in the zoom color signal process unit and the zoom luminance signal process unit, for thereby outputting the zoom-processed digital picture signal.

The zoom luminance signal D_Y outputted from the digital signal process unit 43 is applied to the area varying unit 45, and the signal processed in the area varying unit 45 is used to detect a focus value Fv in the focus value detector 46 and the focus value Fv is applied to the controller 47.

The controller 47 compares and determines the applied focus value, for thereby carrying out an AF control.

Figure 6:
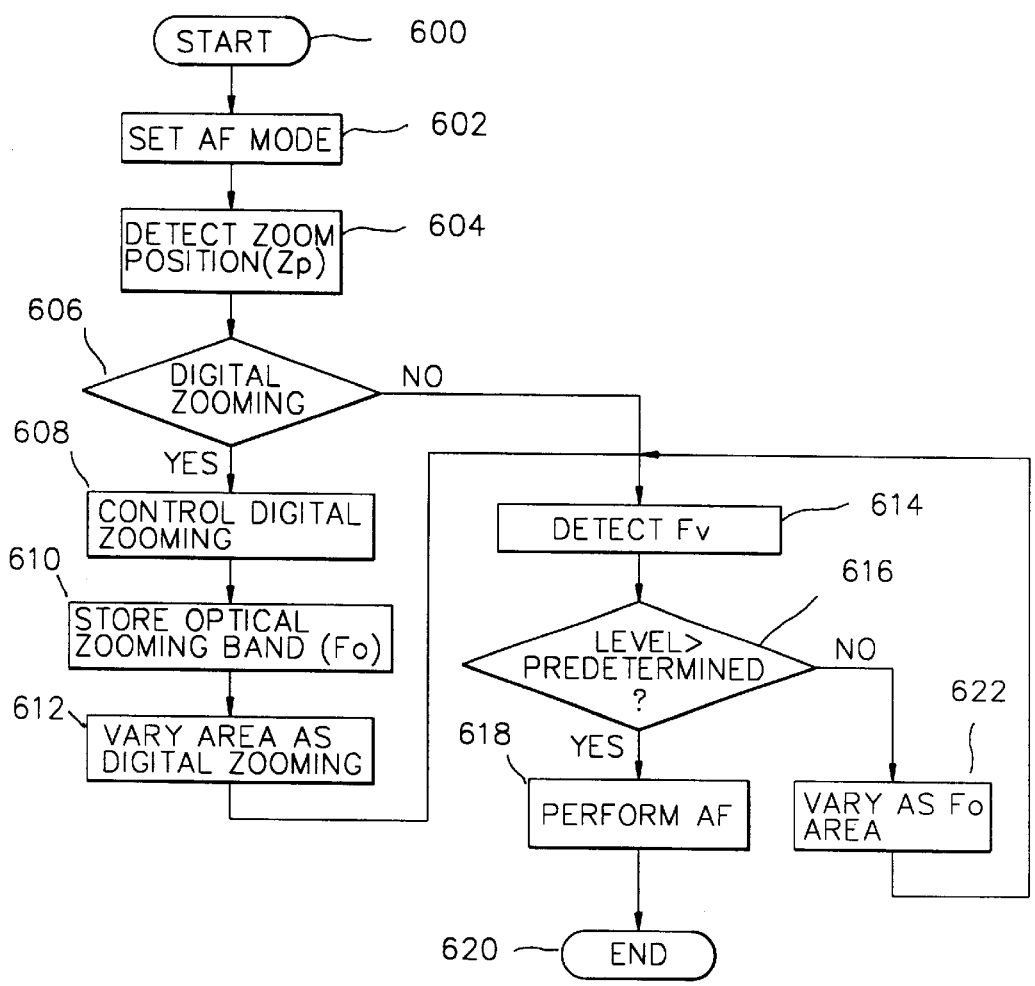
FIG. 6 is a flow chart illustrating operational steps according to the third embodiment of the present invention.

FIG. 6 is a flowchart depicting the operation of the embodiment of FIG. 4. In FIG. 6, after an AF mode is detected at step 602, the controller 45 receives a zoom position signal Zp detected from the optical system 41 at step 604, and determines whether there is currently set a digital zoom mode at step 606.

When a digital zoom mode is determined, the controller 47 controls the area varying unit 45 and carries out a zoom-in/zoom-out control at step 608. Here, an optical zoom area Fo is stored at step 610.

The area varying unit 45 is controlled in a digital zoom mode so as to carry out an area varying function at step 612, and in accordance therewith, the focus value Fv detected from the focus value detector 46 is received at step 614. It is determined whether the focus value Fv remains above a predetermined level at step 616.

The level comparing judgement at step 616 denotes a step for determining whether focusing is possible, wherein if the focus value is greater than a predetermined level, the AF function is carried out at step 618 by controlling the optical system 41 through the driving unit 48 in the controller 47. Else, flow proceeds through step 622.

Here, when the focus value Fv according to the comparing judgement result remains below the predetermined level, that is, when picture focusing becomes difficult, an area varying function is carried out (at step 622) toward the optical zoom area Fo previously stored, for thereby carrying out an AF control.

As described above, in the camera apparatus for detecting a focus value based upon an output picture, an AF operation is controlled on the basis of an output signal of the digital signal process unit or the digital zoom process unit because the picture signal applied to the rear terminal of the digital signal process unit or the rear terminal of the digital zoom process unit is detected as a focus value for carrying out a focusing function, for thereby precisely performing the processing of an object-shooting signal and the AF operation and preventing the focused image from being distorted during a digital zoom operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A camera apparatus for detecting a focus value based upon an output picture, the apparatus comprising:
    object-shooting means for photo-shooting an object and converting an associated optical image into electric signals;
    signal process means for applying a digital signal process and a digital zoom process to the converted picture signal to produce a digital luminance signal, a digital color signal, a digital zoom luminance signal and a digital zoom color signal, respectively;
    focus value detecting means for receiving at least one of the digital zoom luminance and digital zoom color signals and detecting a focus value therein; and
    a controller for carrying out AF (automatic focusing) control using the focus value detected by the focus value detecting means.

2. The apparatus of claim 1, wherein the controller is operable to compare said focus value against a predetermined level, to select one of said digital luminance signal and said digital zoom luminance signal, and to perform said AF control based upon the selected signal.

3. A camera apparatus for detecting a focus value based upon an output picture, the apparatus comprising:
    object-shooting means for photo-shooting an object and converting an associated optical image into electric signals;
    signal process means for applying a digital signal process to the converted picture signal to produce a digital luminance signal and a digital color signal;
    zoom process means for receiving the digital luminance and color signals and applying a digital zoom process function to produce a digital zoom luminance signal and a digital zoom color signal;
    switching means for selecting one of the digital luminance signal and the digital zoom luminance signal;
    focus value detecting means for receiving the signal selected by the switching means and detecting the focus value therein; and
    a controller for controlling the switching means depending upon a quality level of a digital zooming state, and carrying out an AF control in accordance with the focus value detected by the focus value detecting means.

4. The apparatus of claim 3, wherein the controller is operable to compare said focus value against a predetermined level, to select one of said digital luminance signal and said digital zoom luminance signal based upon the comparison, and to perform said AF control based upon the selected signal.

5. The apparatus of claim 4, wherein if said focus value is below a predetermined level, then the controller is operable to select the digital luminance signal on which to base said AF control.

6. A method for automatically focusing a camera, the method comprising the steps of:
    providing, via an opto-electric system, an electrical analog of an optical image;
    digitizing said electrical analog to provide a first digital signal;
    separating said first digital signal into a basic digital luminance signal and a basic digital color signal;
    zoom processing said basic digital luminance signal and said basic digital color signal to provide a digital zoom luminance signal and a digital zoom color signal;
    detecting a focus value of said digital zoom luminance signal;
    comparing said focus value against a predetermined level;
    selecting one of said digital zoom luminance signal and said basic digital luminance signal according to the comparison; and
    automatically focusing said opto-electric system based upon the selected signal.

7. The method of claim 6, wherein said step of selecting selects said digital zoom luminance signal if said focus value is equal to or greater than said predetermined level.

8. The apparatus of claim 1, wherein: said object-shooting means also is operable to provide a signal Zp, indicative of a zoom position, to said controller; and
    said controller also is operable to control said digital zoom process as a function of said signal Zp.

9. The apparatus of claim 3, wherein:

said object-shooting means also is operable to provide a signal Zp, indicative of a zoom position, to said controller; and said controller also is operable to control said digital zoom process function as a function of said signal Zp.

10. The method of claim 7, further comprising:

providing a signal Zp indicative of a zoom position; and controlling said step of zoom processing according to said signal Zp.

11. A method for automatically focusing a camera, comprising the steps of:

providing, via an opto-electric system, an electrical analog of an optical image and a signal Zp indicative of a zoom position;

providing a digital luminance signal based upon said electrical analog;

digitally zoom processing said digital luminance signal according to said signal Zp to provide a zoomed luminance signal; and automatically focusing said opto-electric system based upon said zoomed luminance signal.

12. The method of claim 11, further comprising:

determining a focus value Fv of said zoomed luminance signal;

wherein said step of automatically focusing focuses according to said focus value Fv.

13. The method of claim 12, further comprising:

varying a focus area in said zoomed luminance signal based upon said focus value Fv.

* * * * *